United States Patent
Spiess et al.

(10) Patent No.: US 10,251,237 B2
(45) Date of Patent: Apr. 2, 2019

(54) LIGHT DEVICE AND METHOD FOR CONTROLLING A LIGHT DEVICE

(71) Applicant: IART LAB GMBH, Basel (CH)

(72) Inventors: Valentin Benjamin Spiess, Basel (CH); Juan José Ferrari, Basel (CH)

(73) Assignee: IART LAB GMBH, Basel (CH)

( * ) Notice: Subject to any disclaimer, the term of this patent is extended or adjusted under 35 U.S.C. 154(b) by 0 days.

(21) Appl. No.: 15/569,258

(22) PCT Filed: Apr. 28, 2016

(86) PCT No.: PCT/EP2016/059512
§ 371 (c)(1),
(2) Date: Oct. 25, 2017

(87) PCT Pub. No.: WO2016/174147
PCT Pub. Date: Nov. 3, 2016

(65) Prior Publication Data
US 2018/0124897 A1    May 3, 2018

(30) Foreign Application Priority Data

Apr. 28, 2015  (CH) .................................. 583/15

(51) Int. Cl.
*H05B 33/08* (2006.01)
*F21V 7/00* (2006.01)
(Continued)

(52) U.S. Cl.
CPC ....... *H05B 33/0896* (2013.01); *F21V 7/0016* (2013.01); *G02B 6/005* (2013.01);
(Continued)

(58) Field of Classification Search
CPC ............ H05B 33/0815; H05B 33/0818; H05B 33/0884
(Continued)

(56) References Cited

U.S. PATENT DOCUMENTS

2007/0228999 A1* 10/2007 Kit ..................... H05B 33/0803
                                                                  315/291
2008/0212215 A1*  9/2008 Schofield ................ B60C 23/00
                                                                  359/844
(Continued)

FOREIGN PATENT DOCUMENTS

EP         2 804 443        11/2014
WO       2009/040698         4/2009
(Continued)

OTHER PUBLICATIONS

International Search Report and Written opinion issued in PCT/EP2016/059512, dated Aug. 25, 2016.

*Primary Examiner* — Douglas W Owens
*Assistant Examiner* — Syed M Kaiser
(74) *Attorney, Agent, or Firm* — Medler Ferro Woodhouse & Mills PLLC

(57) ABSTRACT

A light device comprises at least one light module having a front side and a rear side, as well as a lighting means arranged for emitting light from the front side, a lighting means arranged for emitting light from the rear side, and a control unit. The control unit is configured for adjusting the front-side lighting means and the rear-side lighting means. In particular, the control unit is configured to calibrate the light module to a light level that can be preset, to dynamically adjust the front-side lighting means for the display of information, and to adjust the rear-side lighting means such that it is adapted to the dynamically adjusted front-side lighting means, so that the calibrated light level is constant. In this way, the light device can influence the lighting properties in a target area in such a way that an impairment of the illumination of the target area is minimal for displaying the information even with varying lighting properties of the front lighting means.

16 Claims, 8 Drawing Sheets

(51) Int. Cl.
*F21V 8/00* (2006.01)
*H05B 37/02* (2006.01)
*F21Y 115/15* (2016.01)

(52) U.S. Cl.
CPC ..... *H05B 33/0869* (2013.01); *H05B 37/0218* (2013.01); *H05B 37/0272* (2013.01); *F21Y 2115/15* (2016.08); *H05B 37/0227* (2013.01); *Y02B 20/46* (2013.01)

(58) Field of Classification Search
USPC .................. 315/185 R, 187, 151, 152, 294
See application file for complete search history.

(56) References Cited

U.S. PATENT DOCUMENTS

| | | | | |
|---|---|---|---|---|
| 2011/0221998 | A1* | 9/2011 | Adachi | G02B 6/0036 349/62 |
| 2011/0234802 | A1* | 9/2011 | Yamada | B60R 1/00 348/148 |
| 2012/0163027 | A1 | 6/2012 | Vissenberg et al. | |
| 2012/0206050 | A1* | 8/2012 | Spero | B60Q 1/04 315/152 |
| 2012/0299480 | A1* | 11/2012 | Peting | H05B 33/0815 315/113 |
| 2013/0229112 | A1* | 9/2013 | Van Der Werff | H05B 37/0245 315/151 |
| 2014/0052220 | A1* | 2/2014 | Pedersen | A61N 5/0618 607/88 |
| 2014/0285429 | A1* | 9/2014 | Simmons | G02B 27/225 345/156 |
| 2014/0339989 | A1* | 11/2014 | Stockburger | H05B 33/0869 315/159 |
| 2015/0163881 | A1* | 6/2015 | Pederson | H05B 33/0863 315/154 |
| 2015/0260903 | A1* | 9/2015 | Kashima | G02B 6/0056 349/65 |
| 2015/0373806 | A1* | 12/2015 | Vissenberg | H05B 33/0872 315/151 |
| 2016/0174039 | A1* | 6/2016 | Huang | H04W 4/023 455/456.3 |
| 2017/0194522 | A1* | 7/2017 | Wang | H01L 31/035281 |
| 2017/0301273 | A1* | 10/2017 | Atkinson | G09G 3/04 |

FOREIGN PATENT DOCUMENTS

| | | |
|---|---|---|
| WO | 2014/037359 | 3/2014 |
| WO | 2014/115048 | 7/2014 |
| WO | 2014/184009 | 11/2014 |

* cited by examiner

LIGHT DEVICE AND METHOD FOR CONTROLLING A LIGHT DEVICE

TECHNICAL FIELD

The invention relates to a lighting device according to the preamble of independent claim 1 as well as to an associated control method.

Such lighting devices comprising at least one light module, which has a front side and a rear side, as well as a front lighting means arranged for emitting light from the front side, a rear lighting means arranged for emitting light from the rear side and a control unit, wherein the control unit is configured to adjust the front lighting means and the rear lighting means, can be used, for example, for illuminating spaces or illuminating inner or outer surfaces.

PRIOR ART

A wide variety of types of lighting devices are used nowadays for illuminating outer and inner spaces. For example, lighting devices are prevalent which are attached directly to walls or ceilings, positioned on the ground or on another surface or installed in a suspended manner. Various lighting means are used for generating light, wherein lighting means comprising light-emitting diodes (LED) are growing in popularity for various reasons. For example, LEDs can be used flexibly, have a relatively long service life and can be operated in a relatively energy-efficient manner. More recently, organic light-emitting diodes (OLEDs) are being increasingly used as lighting means. OLEDs are luminous thin-layer components made from organic semiconducting materials, which differ from conventional LEDs in that the electric current density and the luminance are lower and no monocrystalline materials are required. Compared to conventional LEDs, OLEDs can be produced inexpensively and in any form using thin-layer technology.

In order to generate preferred luminous properties, it is often expedient that lighting devices emit light from their front sides and from their rear sides at the same time. In particular, a uniform low-contrast illumination can be produced in this way. For example, such lighting devices comprise a front lighting means which emits light from the front side into a front space, and a rear lighting means which emits light from the rear side into a rear space. Typically, the lighting devices are mounted in such a way that the front lighting means can emit light directly into the inner or outer space or the target space to be illuminated, and that the rear lighting means emits light indirectly, for example reflected by a ceiling or wall, into the target space. Together, the front and rear lighting means can thus generate a preferred light level in the target space.

In addition to that, modern lighting devices can be adjusted or configured increasingly more flexibly. For example, users are often able to adapt certain light properties such as the brightness or the colour. Lighting devices can also be designed to automatically adapt to certain luminous properties. For example, lights are known which increase their brightness when someone is in their vicinity or which switch off when there is no one in their vicinity.

A disadvantage of known lighting devices can be that, in the event of a change in the light properties, the light level in the space to be illuminated changes. If, for example, the colour of light of the front lighting means is adjusted, the light level in the target space changes, which is additionally influenced by the reflected light of the rear lighting means. It is typically complicated and difficult to adapt light properties of lighting devices without adversely affecting the illumination of the target space. In particular, in the case of relatively frequently or rapidly changing luminous properties, such as, for example, in the case of information being displayed via the front lighting means, this adverse effect can assume an undesirable degree.

The object of the present invention is therefore to propose a lighting device or a control method for a lighting device, with which light properties in a target space can be adapted with a minimised adverse effect on the illumination of the target space.

DISCLOSURE OF THE INVENTION

The object is achieved according to the invention by a lighting device as defined in independent claim 1, and by a method as defined in independent claim 14. Advantageous alternative embodiments of the invention result from the dependent claims.

The essence of the invention consists in the following: A lighting device comprises at least one light module, which has a front side and a rear side. The at least one light module comprises a front lighting means arranged for emitting light from the front side, a rear lighting means arranged for emitting light from the rear side and a control unit. The control unit is designed to adjust the front lighting means and the rear lighting means. In addition, the control unit of the at least one light module is designed to calibrate the light module to a pre-adjustable level of light, to dynamically adjust the front lighting means for displaying information, and to adaptively adjust the rear lighting means to the dynamically adjusted front lighting means such that the calibrated light level is constant.

In the context of the invention, the term 'light level' can relate to a perceived light level at a target location or in a target space. In the context, the light level during operation of the lighting device can be perceived by a user or a user group. The light level can correlate with the intensity of the light in the target space. It can represent a perceived illumination of the target space, which is necessary, for example, for a specific use in the target space.

In order to set the front and rear lighting means, the control unit can generate signals and transmit them to the lighting means. As is known, a signal corresponds in the technical sense to a measurable physical variable, such as, for example, an electrical voltage or a field strength, associated with a piece of information. Such signals can be generated, transmitted, received and evaluated in various known manners. All settings which, as described above and below, are carried out on the front and/or rear lighting means by the control unit, can be implemented by signals generated by the control unit and transmitted to the front or rear lighting means.

For the purpose of calibration, the light level can be detected or measured by a calibration device such as, for example, a camera or a light intensity sensor. The calibration device can be connected to the control unit of the lighting device and transmit calibration signals thereto. It can be set up, in particular, in a target space, wherein the target space or target location can be the space or location which is illuminated or is intended to be illuminated by the lighting device. During or before calibration, in particular, the light level at the target location or in the target space can be preadjusted. The light level is then constant at this target location or target space.

According to the invention, the at least one light module of the lighting device can therefore transmit information on the front lighting means, or on a multiplicity thereof, into the target space or display information therein. At the same time, the control unit of the light module automatically adapts the rear lighting means such that the light level in the target space can be kept constant or virtually constant as preadjusted. In this way, the lighting device can influence the light properties in the target space such that an adverse effect on the illumination of the target space is minimised, even if the front lighting means is being used to display information.

Preferably, the light level is composed of a portion of the light emitted by the front lighting means and a portion of the light emitted and reflected by the rear lighting means, wherein the control unit of the at least one light module is designed to keep constant a factor of the portion of the light emitted and reflected by the rear light module with respect to the portion of the light emitted by the front light module.

In this context, the term 'factor' can refer to an operand of a multiplication in the mathematical sense. In addition, the term 'reflected' can refer to a reflection of the light emitted by the rear lighting means into the target space. In physics, reflection designates the throwback of waves at an interface at which the wave impedance or the refractive index of the propagation medium changes. Against this background, in connection with the invention, the propagation medium can be air, and the interface can be a surface of a wall or of a ceiling or another surface facing the rear side of the light module. Typically, the light loses some of its intensity during reflection.

The light waves emitted by the rear lighting means are therefore reflected at the interface and at least partially redirected into the target space. The front lighting means can at least partially directly emit light into the target space. The light level in the target space is thus determined by a mixture of a portion of light emitted directly by the front lighting means and a portion of the light emitted by the rear lighting means and reflected into the target space.

By keeping the factor of the portion of the light emitted and reflected by the rear lighting means with respect to the portion of the light emitted by the front lighting means constant, the light level in the target space can also be kept constant in an efficient manner. If, for example, the portion of light emitted by the front lighting means decreases, for example, for information reproduction, the control unit can thus adjust the rear lighting means by multiplying the light emitted by the factor, so that the light level in the target space remains constant.

The control unit of the at least one light module is preferably designed in the event of a change in the front lighting means to change the rear lighting means inversely proportionally to the change in the front lighting means. For example, the light intensity of the light emitted directly into the target space by the front lighting means can be increased in order to display information. In such a case, the light intensity of the light emitted by the rear lighting means into the target space is reduced proportionally. The above-explained factor can be used so that the light emitted by the rear lighting means is reduced by a multiple in comparison with the increase in the light emitted by the front lighting means. In this way, the light level can be kept constant in a simple and efficient manner.

The control unit of the at least one light module preferably comprises a circuit board which has a processor, a working memory and a data memory, wherein the circuit board is arranged between the front lighting means and the rear lighting means. Such a configuration of the at least one light module enables a powerful control unit to be produced in a flat construction.

Preferably, the front lighting means and the rear lighting means of the at least one light module each comprise, or at least one of them comprises, an organic light-emitting diode. The organic light-emitting diodes (OLEDs) can have any preferred basic shape or surface shape. For example, they can be formed square, rectangular, round elliptic, triangular or similar. In particular, when the control unit is realised as described above by means of a circuit board, a compact or flat configuration of the light module can be achieved, for example, in a sandwich structure, by means of the organic light-emitting diodes. A very efficient operation of the lighting device can also be achieved with OLED lighting means.

The front lighting means of the at least one light module is preferably motion-sensitive, wherein the control unit of the at least one light module is designed to adjust the front lighting means and the rear lighting means by evaluating a control signal detected by the front lighting means. For example, the front lighting means can be touch-sensitive. The lighting device can thus be adjusted, for example, switched on or off, dimmed or similar, by the touching of the front lighting means by a user. The front lighting means can also be capacitively designed, for example, to detect close movements in a contactless manner. Thus, the lighting device can be adjusted, for example, by means of contactless swiping movements.

The control unit of the at least one light module preferably comprises an interface, via which the lighting device can be connected to a calibration device, wherein the control unit is designed to receive a calibration signal from the calibration device via the interface and to calibrate the light module to the pre-adjustable light level by evaluating the calibration signal. The calibration device can be, for example, a camera or a brightness sensor. In particular, it can also be a smartphone or a tablet. The calibration signal can contain, for example, information about brightness or light intensity. The interface can be provided in particular for a wireless connection. For example, it can be or comprise a WLAN adapter or Bluetooth adapter which has a transmitter/receiver. The acronym 'WLAN' is understood to mean a wireless local area network as a local radio network. Typically, WLANs are established according to the IEEE-802.11 family standard.

The control unit of the at least one light module preferably comprises an internet interface. In an advantageous embodiment, the internet interface is identical to the interface via which the calibration device can be connected. In particular, it can be provided as a WLAN adapter for a wireless connection to the internet. Information which is displayed by means of the control unit via the front lighting means can be obtained via the internet. For example, information about the weather can be obtained via the internet and displayed in the lighting device.

The control unit of the at least one light module preferably comprises at least one sensor, wherein the control unit is designed to adjust the front lighting means and the rear lighting means by evaluating a signal detected by the sensor. The light level in the target space can be kept constant in a further improved manner by evaluation of sensor signals. For example, the basic brightness generated by sunlight, for example, can be included in the target space by means of a brightness sensor. As a result, the quality of the constant light level in the target space can be further improved. In addition, information can also be acquired via sensors, which information can be displayed by means of the front lighting means. For example, in an application of the lighting device having a plurality of lighting means, the at least one sensor of each lighting means can comprise a light sensor. When the lighting device is regulated to a constant brightness, a visible oscillation can occur in the event of a change in the ambient light. For example, a sudden post-oscillation can be produced in such an application when a person moves past the lighting device and thus briefly changes the ambient light.

In this context the at least one sensor is a sensor of the group of sensors consisting of brightness sensors, presence sensors, infrared sensors, acoustic sensors, thermal sensors, microphones, thermometers, distance sensors, acceleration sensors and cameras or another combination thereof. Information from such sensors can be particularly advantageous in different applications of the lighting device. In particular, the combination of all of these sensors or a specific selection thereof can be advantageous.

The lighting device preferably has a peripheral sensor, wherein the control unit of the at least one light module is designed to adjust the front light means and the rear lighting means by evaluating a signal detected by the peripheral sensor. The peripheral sensor can be, for example, a brightness sensor, a presence sensor, an infrared sensor, an acoustic sensor, a thermal sensor, a microphone, a thermometer, a distance sensor, an acceleration sensor or a camera. It can be positioned remotely from the light modules of the lighting device. For example, the peripheral sensor can be a camera which is set up anywhere and is connected to the light modules via the internet. The control unit of the light module can then evaluate signals detected by the camera or another sensor and adjust the front and rear lighting means. In this way, peripheral information about the lighting device can be displayed. For example, the peripheral sensor can transmit light information from an outside of a building into a room in which no light can enter from the outside (windowless room). Alternatively, information can be detected at another location in the world, be transmitted to the lighting device and be displayed by the latter. Such an embodiment of the lighting device enables a plurality of new location-independent applications.

The light module can have a rear mounting holder, by means of which it can be mounted on a wall, for example, or it can be attached to a ceiling by means of suspension. Alternatively, the lighting device preferably comprises a holder having a plurality of electrically conductive rods and a power supply connected to the rods, wherein the at least one light module has lateral current collectors, and wherein the rods are arranged such that they clamp the light module between themselves and in the process contact the current collectors of the at least one light module. As a result, the light module can be efficiently supplied with current via the rods. The holder can be designed to be freestanding or attached to a supporting structure such as, for example, a ceiling. The light module can be positioned freely between at least two adjacent rods. In particular, when using a plurality of light modules in the lighting device, this enables a flexibly configurable arrangement. The lighting device can thus be adapted for different applications.

Preferably, the lighting device comprises a plurality of identical light modules, wherein the plurality of light modules are connected to each other to form a network in which each of the light modules forms a node. In this way, the lighting device can be produced as a pixel-based system which allows versatile and variable application of the lighting system. The light modules can communicate with one another via the network and exchange information.

Another aspect of the invention relates to a method for controlling a lighting device having at least one light module, which has a front side and a rear side, and a front lighting means arranged for emitting light from the front side, a rear lighting means arranged for emitting light from the rear side, and a control unit. The control unit is designed to adjust the front lighting means and the rear lighting means. The method comprises the following steps: (i) calibrating of the light module to a pre-adjustable level of light; (ii) dynamic adjusting of the front lighting means in order to display information; and (iii) adaptive adjusting of the rear lighting means to the dynamically adjusted front lighting means so that the calibrated light level of the light module is constant.

The steps (i) to (iii) can be carried out in particular by the control unit of the light module in any order. Alternatively, they can also be carried out by an external control unit which is connected to the control unit of the light module. In such an arrangement, the external control unit transmits signals to the control unit of the at least one light module, on the basis of which the latter then adjusts the front and rear lighting means. The method according to the invention allows the light properties in the target space to be influenced in an efficient manner in such a way that impairment of the illumination of the target space is minimised.

In this method, the light level is preferably composed of a portion of the light emitted by the front lighting means and a portion of the light emitted and reflected by the rear lighting means, wherein a ratio of the portion of the light emitted and reflected by the rear lighting means to the portion of the light emitted by the front lighting means is kept constant. Since this ratio is kept constant, the light level in the target space can also be kept constant in an efficient manner.

The portion of the light emitted and reflected by the rear lighting means corresponds preferably to the product of a constant factor and of the portion of the light emitted by the front lighting means. In the event of a change in the front lighting means, the rear lighting means is preferably changed inversely proportionally to the change in the front lighting means.

BRIEF DESCRIPTION OF THE DRAWINGS

Further advantageous embodiments of the invention arise from the following description of exemplary embodiments of the invention with the aid of the schematic drawing. In particular, the lighting device according to the invention and the method according to the invention are described in more detail below with reference to the attached drawings on the basis of exemplary embodiments. Shown are.

WAYS OF IMPLEMENTING THE INVENTION

Figure 1:
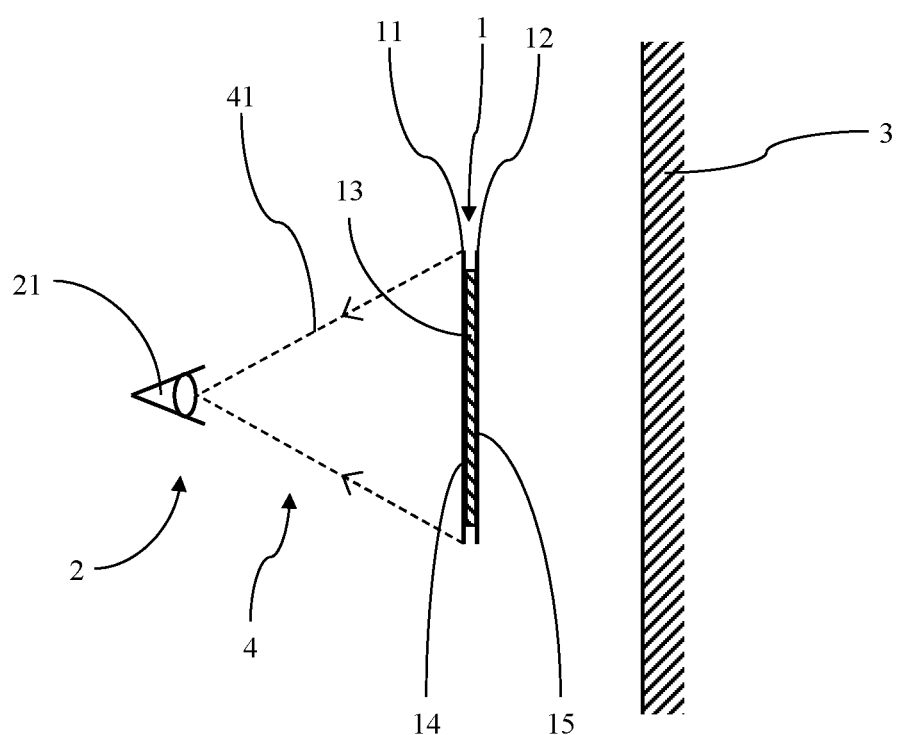
FIG. 1 a schematic cross-sectional view of a light module of a first exemplary embodiment of a lighting device according to the invention.

Certain expressions are used in the following description for practical reasons and must not be construed as limiting. The words "right", "left", "down" and "up" designate directions in the drawing to which reference is made. The expressions "inward", "outward", "below", "above", "left", "right", or the like are used to describe the arrangement of designated parts relative to one another, the movement of designated parts relative to one another, and the directions toward or away from the geometric centre of the lighting device as well as named parts of same, as depicted in the figures. These relative spatial indications also comprise other positions and alignments other than the ones depicted in the figures. For example, if a part depicted in the figures is rotated, then elements or features described as "below" are then "above". The terminology encompasses the words expressly mentioned above, derivatives thereof, and words of similar meaning.

In order to avoid repetitions in the figures and in the associated description of the different aspects and exemplary embodiments, certain features should be understood as common to different aspects and exemplary embodiments. The omission of an aspect from the description or from a figure does not mean that this aspect is lacking in the associated exemplary embodiment. Instead, such an omission may be made for the sake of clarity and for avoiding repetitions. In this connection, the following specification applies to the entire further description: If reference signs are present in a figure for the sake of graphic clarity but not mentioned in the directly associated descriptive text, then reference shall be made to the explanation thereof in preceding figure descriptions. Furthermore, if reference signs are mentioned in the descriptive text directly associated with a figure but are not present in the associated figure, reference shall be made to the preceding and following figures. Similar reference signs in two or more figures stand for similar or identical elements.

FIG. 1 shows one of a plurality of light modules 1 of a first exemplary embodiment of a lighting device according to the invention. The light module 1 comprises a front organic light-emitting diode 11 (OLED) as a front lighting means, a rear OLED 12 as a rear lighting means and a circuit board 13, which is clamped between the front OLED 11 and the rear OLED 12 in a sandwich construction. The light-emitting outer surface of the front OLED 11 forms a front side 14 of the light module 1 and the light-emitting outer surface of the rear OLED 12 forms a rear side 15 of the light module 1.

The light module 1 is attached at a predetermined distance from a wall 3 such that the rear side 15 faces the wall 3 and the front side 14 faces away from the wall 3. The front side 14 of the light module 1 faces a target space 2 which is to be illuminated by the lighting device. An observer or a calibration device 21 is located in the target space 2.

The circuit board 13 of the light module is equipped with various electronic components for operating the light module. In particular, a processor, a working memory and a data memory are located on the circuit board 13, which together are comprised by a control unit of the light module 1. The circuit board 13 is further connected to a WLAN adapter as an internet interface and as an interface for the calibration device 21, a set of sensors and operating components for operating the front OLED 11 and the rear OLED 12.

As shown in FIG. 1, the front OLED 11 emits front light 4 into a front space of the light module 1 in a direction facing away from the wall 3. In the process, a portion 41 of the light or front light 4 emitted by the front OLED 11 is emitted into the target space 2 and can be detected by the calibration device 21. In the state of the light module 1 shown in FIG. 1, the rear OLED 12 emits no light.

Figure 2:
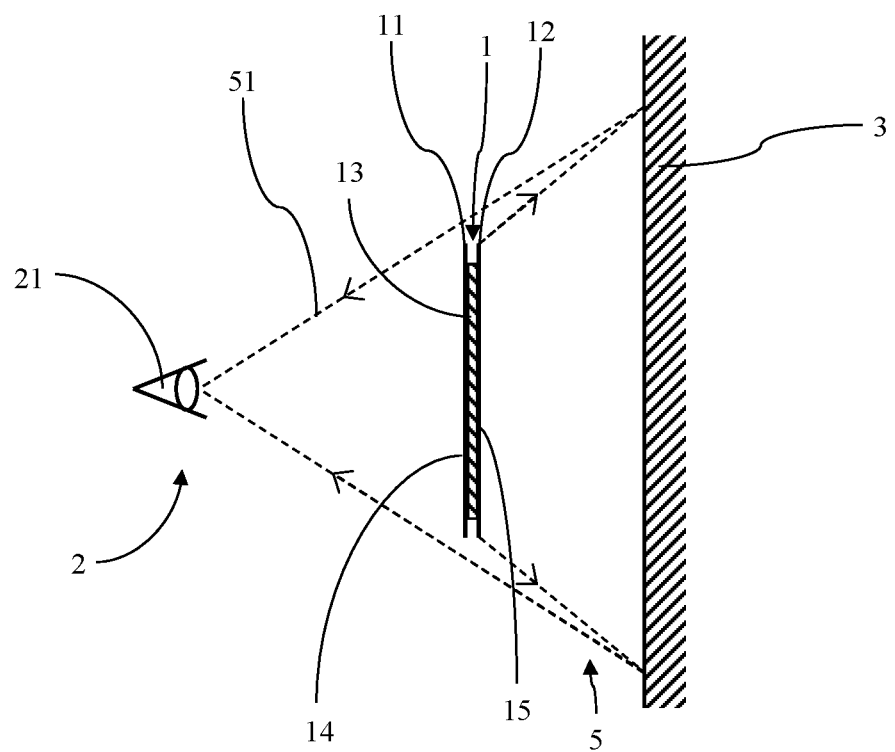
FIG. 2 a further schematic cross-sectional view of the light module from FIG. 1.

As can be seen in FIG. 2, the rear OLED 12 emits rear light 5 onto the wall 3, which is reflected to a substantial degree by the wall 3. A portion 51 of the rear light 5 reflected by the wall 3 is redirected in the process into the target space 2 and can be detected by the calibration device 21. In the state of the light module 1 shown in FIG. 2, the front OLED 11 emits no light.

Figure 3:
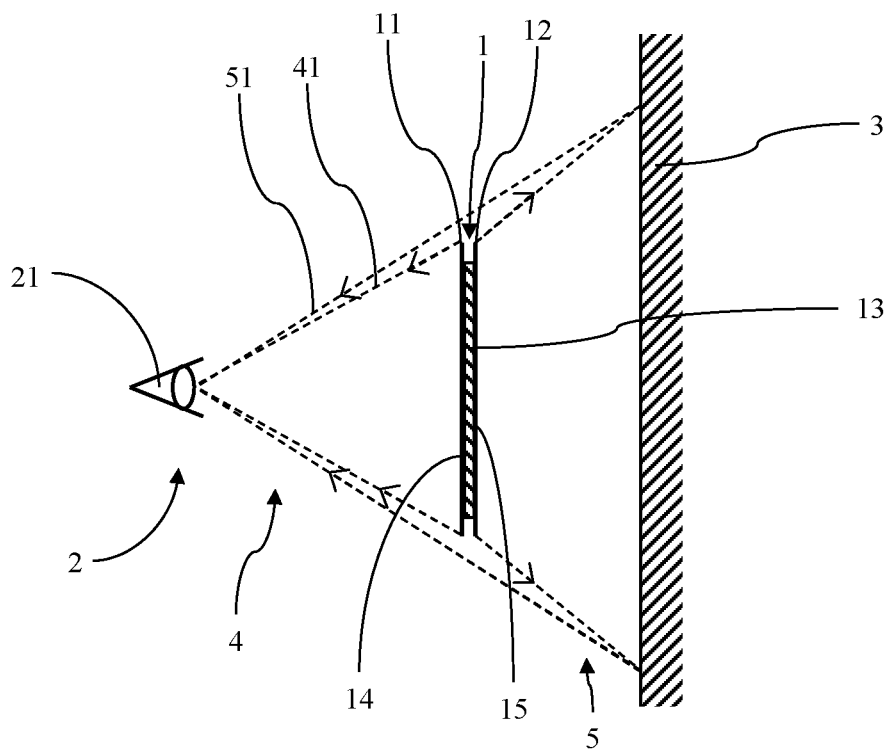
FIG. 3 another further schematic cross-sectional view of the light module from FIG. 1.

The light module 1 is shown in a state in FIG. 3 in which both the front OLED 11 and the rear OLED 12 emit light. In doing so, it is apparent that the portion 41 of the front light 4 and the portion 51 of the reflected rear light 5 converge in the target space 2. The two portions 41, 51 are together crucial for a light level present in the target space 2.

Figure 4:
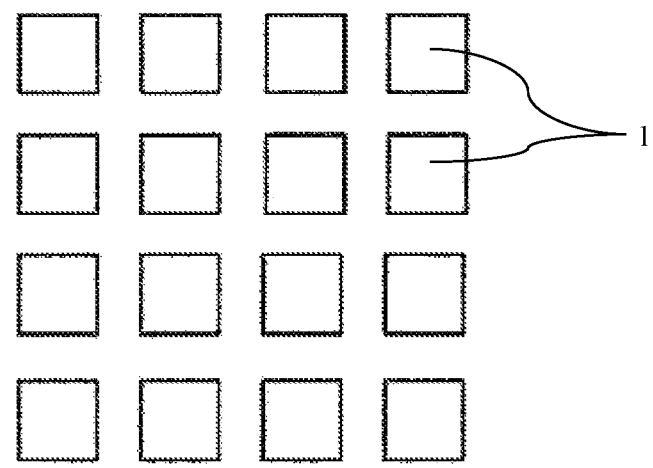
FIG. 4 a first possible arrangement of a plurality of light modules of the lighting device from FIG. 1.

In FIG. 4 the light modules 1 are shown in a first arrangement. In this case, it can be seen that the lighting device has sixteen light modules 1 which can be assembled in a modular and preferred manner. In the first arrangement, the light modules 1 are placed regularly in four rows and four columns in each case of the four light modules 1. In this way, together, they form a square field, wherein the individual light modules 1 interact in a pixel-like manner.

Figure 5:
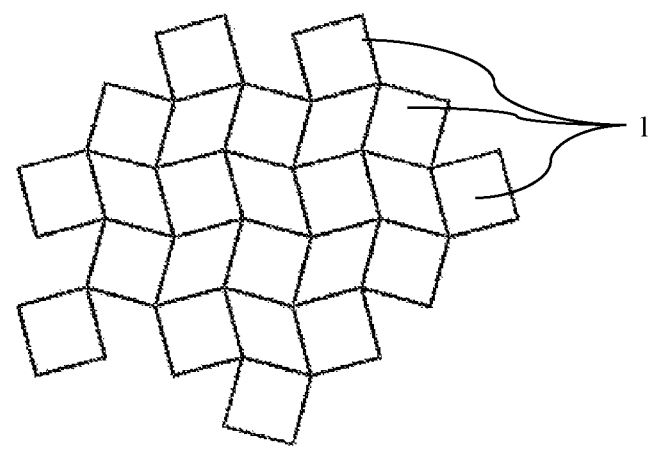
FIG. 5 a second possible arrangement of a plurality of light modules of the lighting device from FIG. 1.

FIG. 5 shows the sixteen light modules 1 in a second arrangement. In this case, the individual light modules 1 are offset and placed rotated relative to one another. The light modules 1 can be combined in any desired manner, so the lighting device enables a high degree of design freedom.

During operation of the lighting device, the light modules 1 together form a wireless network, wherein the individual light modules 1 are in each case nodes of the network which are connected to one another via their WLAN adapter. The lighting device can be optionally supplemented with further light modules 1 or light modules 1 can be removed. If the light modules are arranged as desired, the light modules are calibrated. For this purpose, the front OLED 11 and the rear OLED 12 of the light modules 1 are adjusted and adapted until a preferred light level is reached in the target space 2. This light level is detected by the calibration device 21, which can be, for example, a smartphone, and transmitted to the control units of the individual light modules 1 by means of suitable signals. The control units determine information to be displayed via the WLAN adapters and the sensors of the light modules 1. In that the front OLEDs 11 of the light modules 1 are adjusted by the control units, information or parts thereof are projected into the target space. In this way, the front OLEDs 11 are adjusted dynamically and automatically and the information can be detected by the observer in the target space.

At the same time, the control units also adjust the rear OLEDs 12 of the light modules 1. The rear OLEDs are thus adjusted adaptively in each case to the associated front OLEDs 11 such that the calibrated light level in the target space 2 is kept constant. In particular, a ratio of the portion 51 of the light 5 emitted and reflected by the rear OLED 12 to the portion of the light emitted by the front OLED 11 is kept constant. If, for example, the light intensity of the front OLED 11 of one of the light modules 1 is increased in order to display information, the light intensity of the rear OLED 12 of the same light module 1 is reduced accordingly.

The rear OLED 12 can be adapted relatively efficiently in that the portion 51 of the light 5 emitted and reflected by the rear OLED 12 corresponds to the product of a constant factor and of the portion 41 of the light 4 emitted by the front OLED 11. In this regard, in the event of a change in the front OLED 11, the rear OLED 12 is changed inversely proportionally to the change in the front OLED 11.

The control units of the individual light modules 1 can in each case be programmed or switched such that in order to maintain the light level in the target space 2 in the case of changing light 4 emitted by the front OLED 11, the light 5 to be emitted by the rear OLED 12 is calculated by means of a mathematical equation. For example, a suitable mathematical equation can be derived as follows:

The variables involved are, firstly, the light level S1 emitted by the front OLED 11 and the light level S2 emitted by the rear OLED 12 and, secondly, the portion L1, detected in target space 2, of the light level generated by the front OLED 11 and the portion L2, detected in target space (2), of the light level generated by the rear OLED 12. If the two levels of light S1 and S2 are changed by an equal measure, there are typically different changes in the portions L1 and L2, which are detected in the target space 2. Thus $k=\Delta L1/\Delta L2$, wherein the constant k is typically greater than 1 since a smaller portion of the light generated by the rear OLED 12 than by the front OLED 11 reaches the target space.

The constant k is the variable of the system to be calibrated. In order that the changes in the amounts L1 and L2, detected in target space 2, of the levels of light generated by the two OLEDs 11, 12 are the same, $\Delta S2=k*\Delta S1$. In order to keep the light level in the target space 2 constant, a change in the amount L1 of the light level generated by the front OLED 11 in the target space 2 is compensated over time by means of a corresponding change in the amount L2 of the light level generated by the rear OLED 12 in the target space 2. The following is true: $d(L1)/dt=-d(L2)/dt$. The two OLEDs 11, 12 can thus be adjusted by the control unit in accordance with the following equation in order to keep the light level in the target space 2 constant:

$$d(S2)/dt=-k*d(S1)/dt$$

Figure 6:
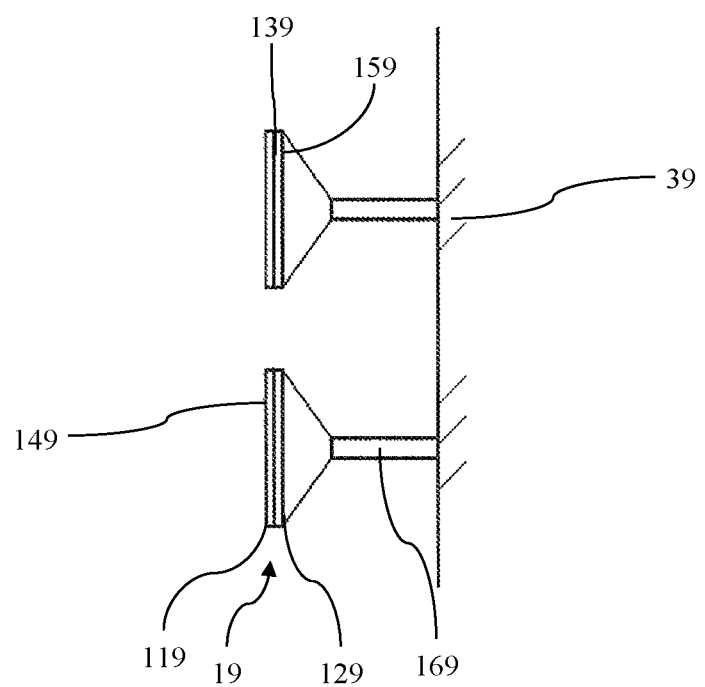
FIG. 6 a schematic cross-sectional view of two light modules of a second exemplary embodiment of a lighting device according to the invention.

In order to illustrate a possible fastening method, two of a plurality of light modules 19 of a second exemplary embodiment of a lighting device according to the invention are shown in FIG. 6. To a large extent the light modules 19 and their modus operandi are similar to the light modules 1 of the preceding FIGS. 1 to 5.

The light modules 19 each comprise a front OLED 119 as a front lighting means, a rear OLED 129 as a rear lighting means and a circuit board 139, which is clamped between the front OLED 119 and the rear OLED 129 in a sandwich construction. The light-emitting outer surface of the front OLED 119 forms a front side 149 of the associated light module 19 and the light-emitting outer surface of the rear OLED 129 forms a rear side 159 of the associated light module 19.

The light modules 19 each comprise a mounting device 169 which has a post and an open OLED socket. The posts of the mounting devices 169 of the light modules 19 are each mounted horizontally on a wall 39. The OLED sockets of the mounting devices 169 of the light modules 19 hold the rear OLEDs 129 in an open manner, so that their light emission in the direction of the wall 39 is impaired as little as possible.

Figure 7:
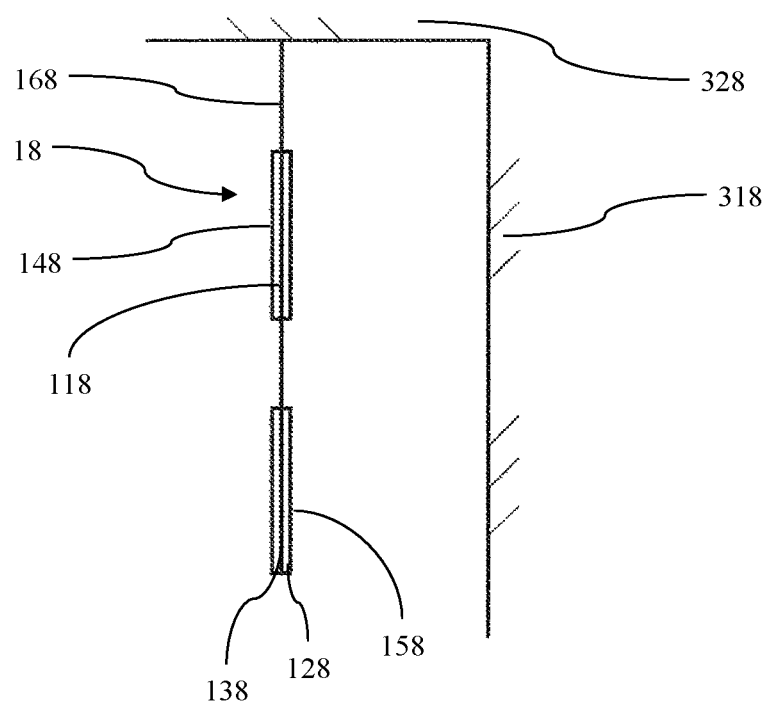
FIG. 7 a schematic cross-sectional view of two light modules of a third exemplary embodiment of a lighting device according to the invention.

In order to illustrate an alternative possible fastening method, FIG. 7 shows two of a plurality of light modules 18 of a third exemplary embodiment of a lighting device according to the invention. To a large extent the light modules 19 and their modus operandi are similar to the light modules 1 of the preceding FIGS. 1 to 5.

The light modules 18 each comprise a front OLED 118 as a front lighting means, a rear OLED 128 as a rear lighting means and a circuit board 138, which is clamped between the front OLED 118 and the rear OLED 128 in a sandwich construction. The light-emitting outer surface of the front OLED 118 forms a front side 148 of the associated light module 18 and the light-emitting outer surface of the rear OLED 128 forms a rear side 158 of the associated light module 18.

The light modules 18 further each comprise a mounting wire 168. The mounting wire 168 is fastened to a ceiling (328) and hangs vertically downwards. The light modules 18 are clamped to the mounting wire 168 and are thus aligned horizontally such that the light emission of the rear OLED 128 occurs in the direction of a wall 318 and the light emission of the front OLED 118 occurs away from the wall 318. The power or current supply for operating the light modules 18 is supplied via the mounting wire 168.

Figure 8:
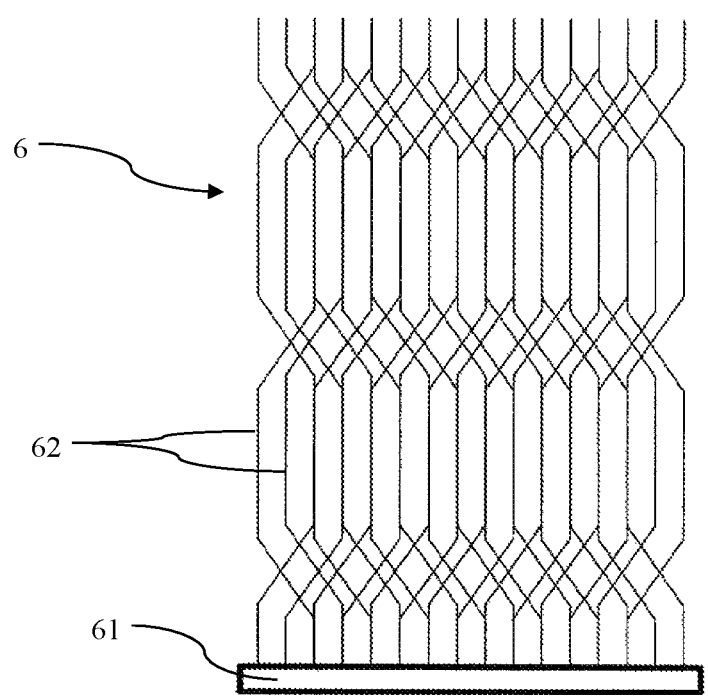
FIG. 8 a schematic front view of a holder for light modules of a lighting device according to the invention.
Figure 9:
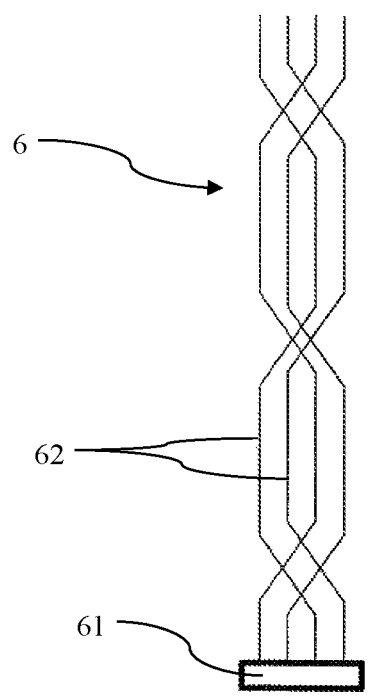
FIG. 9 a schematic side view of the holder from FIG. 8.

FIGS. 8 and 9 show a holder 6, such as is suitable for mounting light modules 1, 18, 19 of the type shown in the preceding figures. The holder 6 comprises a plurality of electrically conductive rods 62 which are fastened on a base 61. The rods 62 extend upwards from the base 61 and each have four vertical and three bevelled diagonal sections. The base 61 is designed to supply energy as a power feed.

In operation, light modules are each inserted and clamped between two adjacent rods 62. They can be inserted at any point in the holder 6, which enables a large degree of design freedom. The light modules comprise lateral contacts as current collectors, which contact the rods 62 when they are clamped therebetween. As a result, the light modules can be supplied with current in a simple manner via the rods 62. The use of OLED technologies for generating light makes it possible for the entire lighting device to be operated in a low-voltage range. The voltage can in this case be so low that protective measures in respect of the current-carrying rods 62 can be dispensed with.

Although the invention is depicted and described in detail by means of the figures and the associated description, this depiction and this detailed description are to be understood as illustrating and exemplifying, but not limiting, the invention. In order not to embellish the invention, in certain cases well-known structures and techniques may not be shown and described in detail. Obviously persons skilled in the relevant art can make changes and modifications without exceeding the scope of the following claims. In particular, this invention covers further exemplary embodiments with any combinations of features that may deviate from the explicitly described combinations of features.

This disclosure also comprises embodiments with any combination of features that are mentioned or shown in the preceding or following with regard to different embodiments. It also comprises individual features in the figures, even if they are shown therein in connection with other features and/or not mentioned in the preceding or following. The alternatives to embodiments and individual alternatives to the features thereof described in the figures and in the description may also be excluded from the subject matter of the invention or from the disclosed subject matter. The disclosure comprises embodiments that exclusively comprise the features described in the claims or in the exemplary embodiments, as well as embodiments that comprise additional, other features.

In addition, the expression "comprise" and derivatives thereof do not exclude other elements or steps. The indefinite article "a" or "an" and derivatives thereof likewise do not exclude a plurality. The functions of several of the features listed in the claims can be fulfilled by a unit or by a step. In particular, the terms "substantially", "about", "approximately" and the like used in connection with a property or a value also define the property precisely or define the value precisely. When used in connection with a given numerical value or—range, the terms "ca" and "approximately" can refer to a value or range that lies within 20%, within 10%, within 5%, or within 2% of the given value or range.

The invention claimed is:

1. A lighting device comprising:
  at least one light module which has a front side and a rear side and a front lighting means arranged for emitting light from the front side, a rear lighting means arranged for emitting light from the rear side, and a control unit,
  wherein the control unit of the at least one light module is arranged to adjust the front lighting means and the rear lighting means,
  wherein the control unit of the at least one light module comprises an interface, via which the lighting device can be connected to a calibration device,
  wherein the control unit of the at least one light module is designed to receive a calibration signal from the calibration device via the interface, and
  wherein the control unit of the at least one light module is arranged to calibrate the at least one light module to a pre-adjustable light level by evaluating the calibration signal, to dynamically adjust the front lighting means for displaying information, and to adjust the rear lighting means to the dynamically adjusted front lighting means such that the calibrated light level is constant.

2. The lighting device according to claim 1, wherein the light level is composed of a portion of the light emitted by the front lighting means and a portion of the light emitted by the rear lighting means and reflected, wherein the control unit of the at least one light module is designed to keep constant a factor of the portion of the light emitted by the rear lighting means and reflected with respect to the portion of the light emitted by the front lighting means.

3. The lighting device according to claim 1, wherein the control unit of the at least one light module is arranged, in the event of a change in the front lighting means, to change the rear lighting means inversely proportionally to the change in the front lighting means.

4. The lighting device according to claim 1, wherein the control unit of the at least one light module comprises a circuit board which has a processor, a working memory and a data memory, wherein the circuit board is arranged between the front lighting means and the rear lighting means.

5. The lighting device according to claim 1, wherein the front lighting means of the at least one light module comprises an organic light-emitting diode, wherein the rear lighting means of the at least one light module comprises an organic light-emitting diode, or wherein the front lighting means of the at least one light module and the rear lighting means of the at least one light module each comprise an organic light-emitting diode.

6. The lighting device according to claim 1, wherein the front lighting means of the at least one light module is motion-sensitive, wherein the control unit of the at least one light module is designed to adjust the front lighting means and the rear lighting means by evaluating a control signal detected by the front lighting means.

7. The lighting device according to claim 1, wherein the control unit of the at least one light module comprises an internet interface.

8. The lighting device according to claim 1, wherein the control unit of the at least one light module comprises at least one sensor, wherein the control unit is arranged to control the front lighting means and the rear lighting means by evaluating a signal detected by the sensor.

9. The lighting device according to claim 8, wherein the at least one sensor is a sensor of the group of sensors consisting of brightness sensors, presence sensors, infrared sensors, acoustic sensors, thermal sensors, microphones, thermometers, distance sensors, acceleration sensors and cameras or any combination thereof.

10. The lighting device according to claim 1 further comprising a peripheral sensor, wherein the control unit of the at least one light module is arranged to adjust the front lighting means and the rear lighting means by evaluating a signal detected by the peripheral sensor.

11. The lighting device according to claim 1 further comprising a plurality of identical light modules, wherein the plurality of identical light modules are connected to one another to form a network, in which each of the light modules forms a node.

12. A lighting device comprising:
  at least one light module which has a front side and a rear side and a front lighting means arranged for emitting light from the front side, a rear lighting means arranged for emitting light from the rear side, and a control unit,
  wherein the control unit of the at least one light module is arranged to adjust the front lighting means and the rear lighting means, and
  wherein the control unit of the at least one light module is arranged to calibrate the at least one light module to a pre-adjustable light level, to dynamically adjust the front lighting means for displaying information, and to adjust the rear lighting means to the dynamically adjusted front lighting means such that the calibrated light level is constant; and
  a holder having a plurality of electrically conductive rods and a power supply connected to the plurality of electrically conductive rods, wherein the at least one light module has lateral current collectors, and wherein the plurality of electrically conductive rods are arranged such that they clamp the at least one light module between themselves and in the process contact the lateral current collectors of the at least one light module.

13. A method for controlling a lighting device comprising at least one light module which has a front side and a rear side, and a front lighting means arranged for emitting light from the front side, a rear lighting means arranged for emitting light from the rear side, and a control unit, wherein the control unit is designed to adjust the front lighting means and the rear lighting means comprising the steps of:
  calibrating of the at least one light module to a pre-adjustable light level;
  dynamically adjusting of the front lighting means for displaying information; and
  adaptively adjusting of the rear lighting means to the dynamically adjusted front lighting means so that the calibrated light level of the at least one light module is constant.

14. The method according to claim 13, wherein the light level is composed of a portion of the light emitted by the front lighting means and a portion of the light emitted by the rear lighting means and reflected, wherein a ratio of the portion of the light emitted and reflected by the rear lighting means to the portion of the light emitted by the front lighting means is kept constant.

15. The method according to claim 14, wherein the portion of the light emitted and reflected by the rear lighting means corresponds to the product of a constant factor and of the portion of the light emitted by the front lighting means.

16. The method according to claim 15, wherein in the event of a change in the front lighting means the rear lighting means is changed inversely proportionally to the change in the front lighting means.

\* \* \* \* \*